Nov. 12, 1940.            W. B. FOULKE                2,221,538
                      CLASSIFICATION SYSTEM
                       Filed Aug. 11, 1938
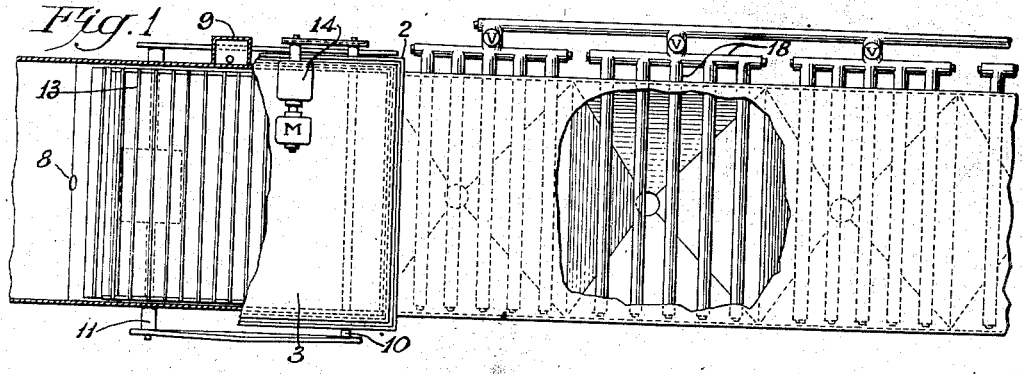
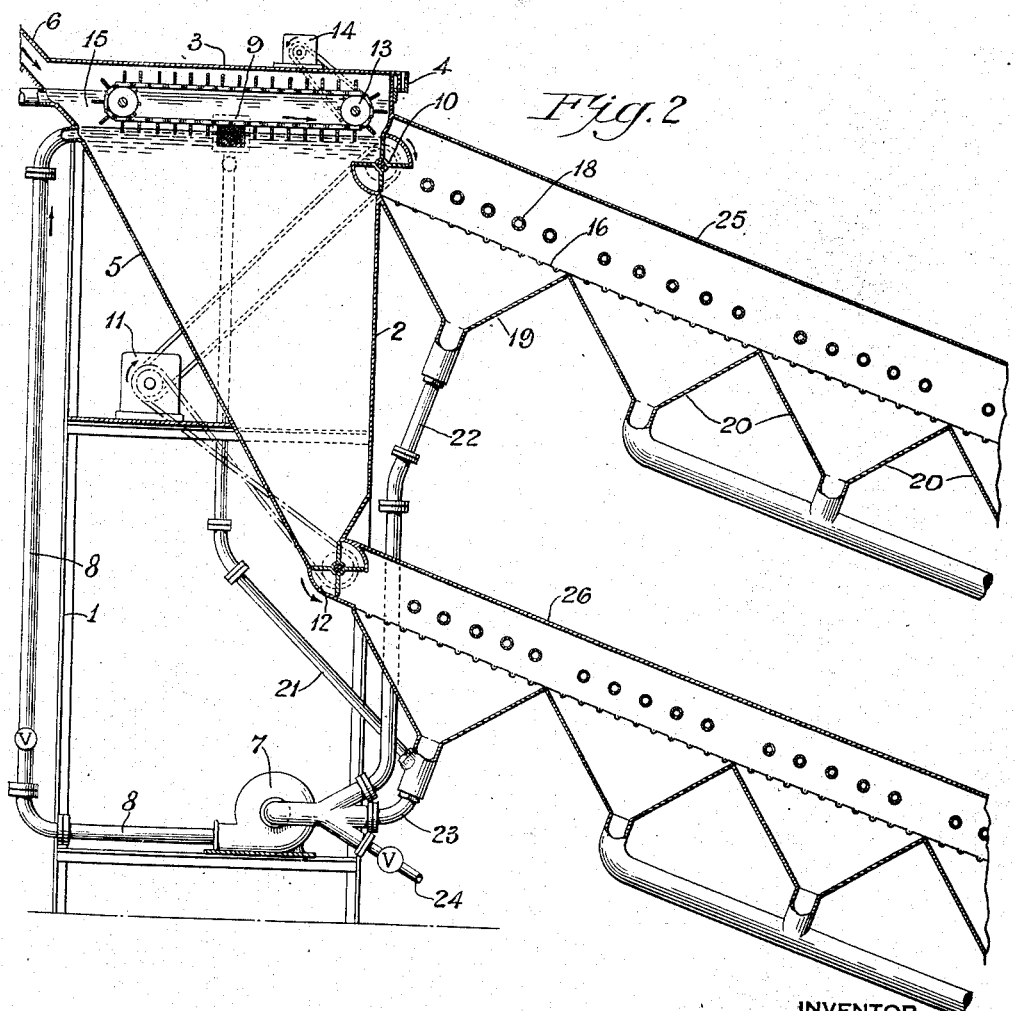
INVENTOR
W. B. Foulke
BY
John L. Seymour
ATTORNEY Patented Nov. 12, 1940

2,221,538

UNITED STATES PATENT OFFICE 2,221,538

CLASSIFICATION SYSTEM

Willing B. Foulke, Media, Pa., assignor to E. I. du Pont de Nemours & Company, Wilmington, Del., a corporation of Delaware Application August 11, 1938, Serial No. 224,251

3 Claims. (Cl. 209—173)

This invention relates to classifying apparatus which finds utility in the separation of solids of one specific gravity from solids of a different specific gravity. This apparatus is of particular use in the separation of coal from slate and in the separation of other minerals from indigenous impurities.

In the drawing, Figure 1 is a plan view, partly broken away, of the apparatus of my invention and Figure 2 is a vertical section through the device of Figure 1.

In the drawing, 1 is a framework; 2 is a tank; 3 is a cover to the tank; 4 is a water seal to prevent the contents of the tank from escaping into the air, said water seal comprising a channel cooperating with a flange on the cover, the channel being filled with water. 5 is an inclined side of the tank; 6 is a chute through which solids may be admitted; 7 is a pump; 8 is a pipe on the force side of the pump leading to the top of the tank; V is a valve in the said pipe; 9 is a means of regulating the liquid level in the tank, of a type which is described in a prior Patent 2,151,579 granted March 21, 1939, to Alexander, du Pont and Foulke, and which is capable of maintaining the level of the liquid used to separate the solids despite the imposition of a supernatant layer of lighter immiscible liquid. 10 is a rotary valve at about the level of the parting liquid; 11 is a motor for driving the said valve. As shown the valve is composed of four vanes and is mounted at its ends in trunnions to be rotatable by the motor. 12 is a valve of the same type at the lower end of the receptacle, and which forms an angle between the sloping side 5 and the front of the receptacle. 13 is a conveyor; 14 is a motor operatively connected to the conveyor. The conveyor is so mounted that its rakes will move anything on the surface of the liquid toward the valves. 15 is a layer of water or other liquid immiscible with the parting liquid which serves as a water seal to prevent the escape of fumes. 16 is a screen arranged to receive the materials discharged by the valve 10; 17 is a screen arranged to receive the materials discharged by the valve 12. Both screens operate alike and only one of them will be described. The screens are designed to allow the passage of liquids, but to prevent the passage of solids. 18 are a series of sprays directed toward the surface of the screen; 19 is a trough beneath the first series of sprays; 20 are a series of troughs beneath other series of sprays; 21—22—23 are pipes which collect the overflow from the receptacle and the first washings from the screens and return them to the pump for reuse. 24 is a pipe from a liquid supply with which the apparatus can be filled; 25—26 are housings completely enclosing the screens.

The apparatus operates as follows: The receptacle is filled with liquid and the motors are started. Coal mixed with slate, for instance, is admitted through the chute, passes through the water seal into the liquid, and the coal floats and the slate sinks. The flow of fluid from the pump 7 carries the floating material toward the upper valve. The inclined side 5 carries the sinking material toward the lower valve. If the current from the pipe 8 is insufficient to drive the floating material to the valve, a conveyor 13 is operated. The valves, as they rotate, take in each quadrant a supply of liquid and solids, and dump them outside the receptacle onto the screens. The slope of the screens is such that the solids find their way down by gravity beneath the sprays. However, the screens can be made reciprocable or vibrating to accomplish the same purpose. The first washings are rich in parting liquid and are separately caught and returned to the systems. The remaining liquids are drawn off through pipes to settling tanks or other means of recovery or to waste. The level of the liquid in the container can be adjusted through the pipe 24 whenever it becomes low through losses. A water layer covers the liquid in the tank.

The apparatus is highly economical and very efficient both in its action and in its consumption of power.

As many apparently widely different embodiments of this invention may be made without departing from the spirit and scope thereof, it is to be understood that I do not limit myself to the specific embodiments thereof except as defined in the appended claims.

I claim:

1. Mineral classifying apparatus comprising, in combination, a liquid receptacle, means for supplying parting liquid thereto, said parting liquid being of gravity so selected that a portion of the solids introduced for classification in said apparatus will float thereon and a portion sink therein, means to maintain the level of said parting liquid in said liquid receptacle, an overlying layer of water positioned in said receptacle above said heavy parting liquid, means for admitting solids to be classified to said liquid receptacle through said overlying water layer and into said parting liquid, rotary valve discharge means positioned at the interface between said water and parting liquid and below said interface for removing liquids and solids from said liquid receptacle, and means for moving both that fraction of the introduced solids which floats on said parting liquid and that fraction of the introduced solids which sinks therein to the vicinity of said rotary discharge valves.

2. Mineral classification apparatus comprising, in combination, a liquid receptacle, means for supplying parting liquid thereto, said parting liquid being of gravity so selected that a portion of the solids introduced for classification in said apparatus will float thereon and a portion sink therein, means to maintain the level of said parting liquid in said liquid receptacle, an overlying layer of water positioned in said receptacle above said heavy parting liquid, means for admitting solids to be classified to said liquid receptacle through said overlying water layer and into said parting liquid, rotary valve discharge means positioned at the interface between said water and parting liquid and below said interface for removing liquids and solids from said liquid receptacle, means positioned below said interface for moving that fraction of the introduced solids which sinks in said parting liquid to the vicinity of said lower rotary discharge valve, and power driven means positioned adjacent said interface for moving that fraction of the introduced solids which floats on said parting liquid to the vicinity of said rotary discharge valve positioned adjacent said interface.

3. Mineral classification apparatus comprising, in combination, a liquid receptacle, means for supplying parting liquid thereto, said parting liquid being of gravity so selected that a portion of the solids introduced for classification in said apparatus will float thereon and a portion sink therein, means to maintain the level of said parting liquid in said liquid receptacle, an overlying layer of water positioned in said receptacle above said heavy parting liquid, means for admitting solids to be classified to said liquid receptacle through said overlying water layer and into said parting liquid, rotary valve discharge means positioned at the interface between said water and parting liquid and below said interface for removing liquids and solids from said liquid receptacle, means for moving that fraction of the introduced solids which sinks in said parting liquid to the vicinity of said rotary discharge valve positioned below said interface, and means comprising a power operated, endless conveyor provided with a plurality of pusher members for conveying that fraction of the introduced solids which floats on said parting liquid to the vicinity of said rotary discharge valve positioned adjacent said interface between said parting liquid and said water, whereby both the fraction of said solids which floats on said parting liquid and the fraction of said solids which sinks in said parting liquid may be removed from said apparatus through said rotary discharge valves.

WILLING B. FOULKE.